(12) United States Patent
Meyer et al.

(10) Patent No.: US 11,351,984 B2
(45) Date of Patent: Jun. 7, 2022

(54) METHODS AND SYSTEM FOR SELECTING AN ENGINE STARTING DEVICE

(71) Applicant: Ford Global Technologies, LLC, Dearborn, MI (US)

(72) Inventors: Jason Meyer, Canton, MI (US); Jeffrey A. Doering, Canton, MI (US); Kevin R. Ruybal, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/034,339

(22) Filed: Sep. 28, 2020

(65) Prior Publication Data

US 2022/0097677 A1    Mar. 31, 2022

(51) Int. Cl.
*B60W 20/40* (2016.01)
*B60W 10/06* (2006.01)
*B60W 10/02* (2006.01)
*B60W 10/08* (2006.01)
*B60K 6/26* (2007.10)

(52) U.S. Cl.
CPC ............ *B60W 20/40* (2013.01); *B60W 10/02* (2013.01); *B60W 10/06* (2013.01); *B60W 10/08* (2013.01); *B60K 2006/268* (2013.01); *B60W 2510/0275* (2013.01); *B60W 2510/0657* (2013.01); *B60W 2510/083* (2013.01); *B60W 2510/1005* (2013.01); *B60W 2710/021* (2013.01); *B60W 2710/08* (2013.01); *B60W 2710/30* (2013.01)

(58) Field of Classification Search
CPC ...... B60W 20/40; B60W 10/08; B60W 10/06; B60W 10/02; B60W 2510/0657; B60W 2510/083; B60W 2710/30; B60W 2710/08; B60W 2710/021; B60K 2006/268; F02N 2200/02
See application file for complete search history.

(56) References Cited

U.S. PATENT DOCUMENTS

| | | | |
|---|---|---|---|
| 10,859,055 B1 | 12/2020 | Doering et al. | |
| 2013/0296126 A1* | 11/2013 | Gibson | B60L 50/40 477/5 |
| 2013/0297105 A1* | 11/2013 | Yamazaki | B60W 20/40 701/22 |
| 2021/0300316 A1* | 9/2021 | Doering | B60W 20/40 |

FOREIGN PATENT DOCUMENTS

| | | | | |
|---|---|---|---|---|
| DE | 102014219221 A1 | * | 3/2016 | F02N 11/00 |
| DE | 102015117991 A1 | * | 4/2017 | B60K 6/387 |
| WO | WO-2021084172 A1 | * | 5/2021 | B60W 20/40 |

OTHER PUBLICATIONS

Doering, J. et al., "Methods and System for Starting an Internal Combustion Engine," U.S. Appl. No. 16/829,291, filed Mar. 25, 2020, 48 pages.
Doering, J. et al., "Methods and System for Adaptively Switching an Engine Starting Device," U.S. Appl. No. 16/983,224, filed Aug. 3, 2020, 53 pages.

* cited by examiner

*Primary Examiner* — Roger L Pang
(74) *Attorney, Agent, or Firm* — Geoffrey Braumbaugh; McCoy Russell LLP

(57) ABSTRACT

A method for operating a vehicle that includes an internal combustion engine that may be automatically stopped and started is described. In one example, selection of an engine starting device is based on a value of an engine starting torque reserve. The engine starting torque reserve may be dynamically adjusted so that life spans of engine starting devices may meet expectations.

8 Claims, 8 Drawing Sheets

METHODS AND SYSTEM FOR SELECTING AN ENGINE STARTING DEVICE

FIELD

The present description relates to methods and a system for starting an internal combustion engine. The methods and systems provide for a dynamically changing torque reserve and dynamically adjusting the torque demand level that triggers an engine start for a driveline disconnect clutch and an electric machine used to start the internal combustion engine.

BACKGROUND AND SUMMARY

A vehicle may include an internal combustion engine and one or more electric machines that may provide torque to a driveline. The one or more electric machines may be configured to provide propulsive effort to propel the vehicle. In addition, the one or more electric machines may be requested to start the engine from time to time after the engine has been automatically stopped or stopped via a specific request that is made via a human driver. Since the one or more electric machines have limited output torque capacity, it may be desirable to provide a way of managing electric machine torque to ensure that the electric machine has torque capacity to start the engine when the engine is in a stopped state.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
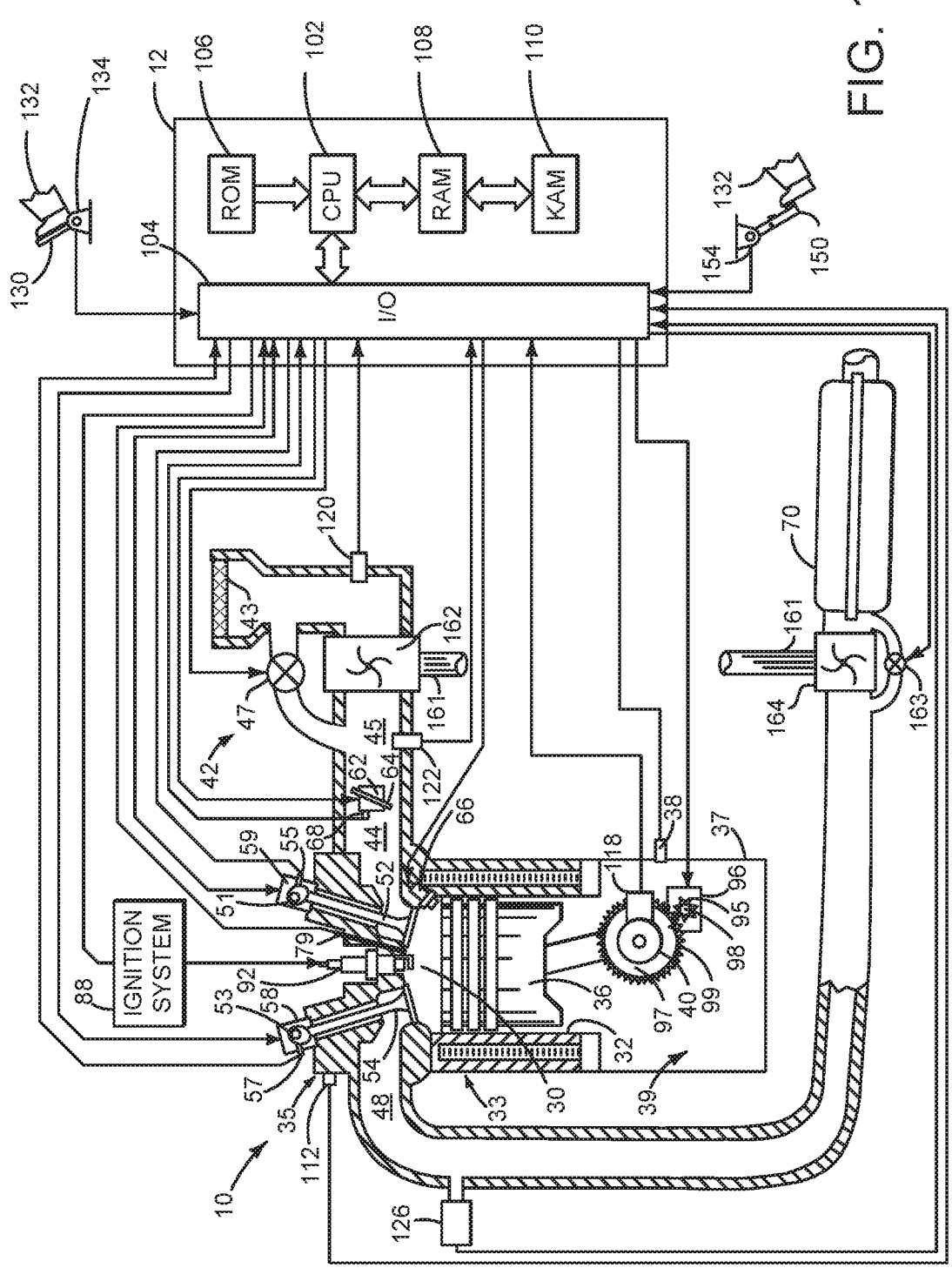
FIG. 1 shows a schematic diagram of an internal combustion engine.

The present description is related to determining an engine starting torque reserve for starting an internal combustion engine via an electric machine. The engine starting torque reserve may be dynamically adjusted according to vehicle operating conditions such as an actual cumulative total number of engine starts in which a flywheel starter cranks an engine and other vehicle operating conditions. For example, the engine starting torque reserve may increase as the actual cumulative total number of engine starts increases from a value of zero to a value of one thousand as a vehicle ages. In addition, the engine may be automatically started according to an urgency level for the engine start that is determined from vehicle operating conditions. For low urgency engine starts, the engine may be started such that the energy to start the engine may be reduced as compared to engine starts that are determined to be of medium or high urgency. For high urgency engine starts, maximum torque capacity of the electric machine and of the engine may be requested so that driver demand torque may be met in a timely manner. The engine and driveline may be of the type shown in FIGS. 1 and 2. The engine starting torque reserve may be a function as shown in FIG. 3A. In addition, the engine starting torque reserve may be based on flywheel and disconnect clutch torque thresholds as shown in FIG. 3B. The driveline may be operated according to the methods of FIGS. 4A-5B. A sequence showing a selection of an electric device for starting an engine is shown in FIG. 6.

A vehicle may include an internal combustion engine that may be cranked and started via two different electric machines. One of the electric machines may be a flywheel starter while the other electric machine may be a driveline integrated starter generator (ISG). It may be not be desirable to have one engine starting device crank and start the engine during all vehicle operating conditions, but it may not be clear whether the flywheel starter or the ISG is best suited engine starting during particular vehicle operating conditions. Therefore, it may be desirable to provide a way of selecting and applying an engine starting device from a group of engine starting devices.

The inventors herein have recognized the above-mentioned issues and have developed a method for operating a vehicle, comprising: adjusting an engine starting torque reserve via a controller in response to an actual total cumulative number of engine starts in which a flywheel starter cranks an engine; and starting the engine via a flywheel starter or via an integrated starter/generator and a driveline disconnect clutch responsive to the engine starting torque reserve.

By dynamically adjusting an engine starting torque reserve, it may be possible to provide the technical result of influencing which engine starting device is selected to start an engine during a particular set of vehicle operating conditions. The ISG may be selected to start the engine during conditions after the flywheel starter has been applied frequently to start the engine. Further, engine starting torque reserve may be adjusted according to a presently engaged transmission gear and vehicle speed so that the selected engine starting device has a torque or power output capacity to start the engine without generating a driveline torque hole (e.g., a reduction in driveline torque that may result in a vehicle speed reduction and/or driveline torque disturbance).

The present description may provide several advantages. Specifically, the approach may help to ensure that an electric machine and driveline disconnect clutch have sufficient torque capacity to meet driver demand and start an engine. Further, the approach may balance wear of engine starting devices. In addition, the approach may base engine starting device selection on engine stopping position so that the selected engine starting device may rotate the engine in an expected way.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices. Controller 12 may reduce compression in cylinder 30 via opening compression relief valve 79 during engine starting to reduce engine cranking torque.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to a propulsion pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
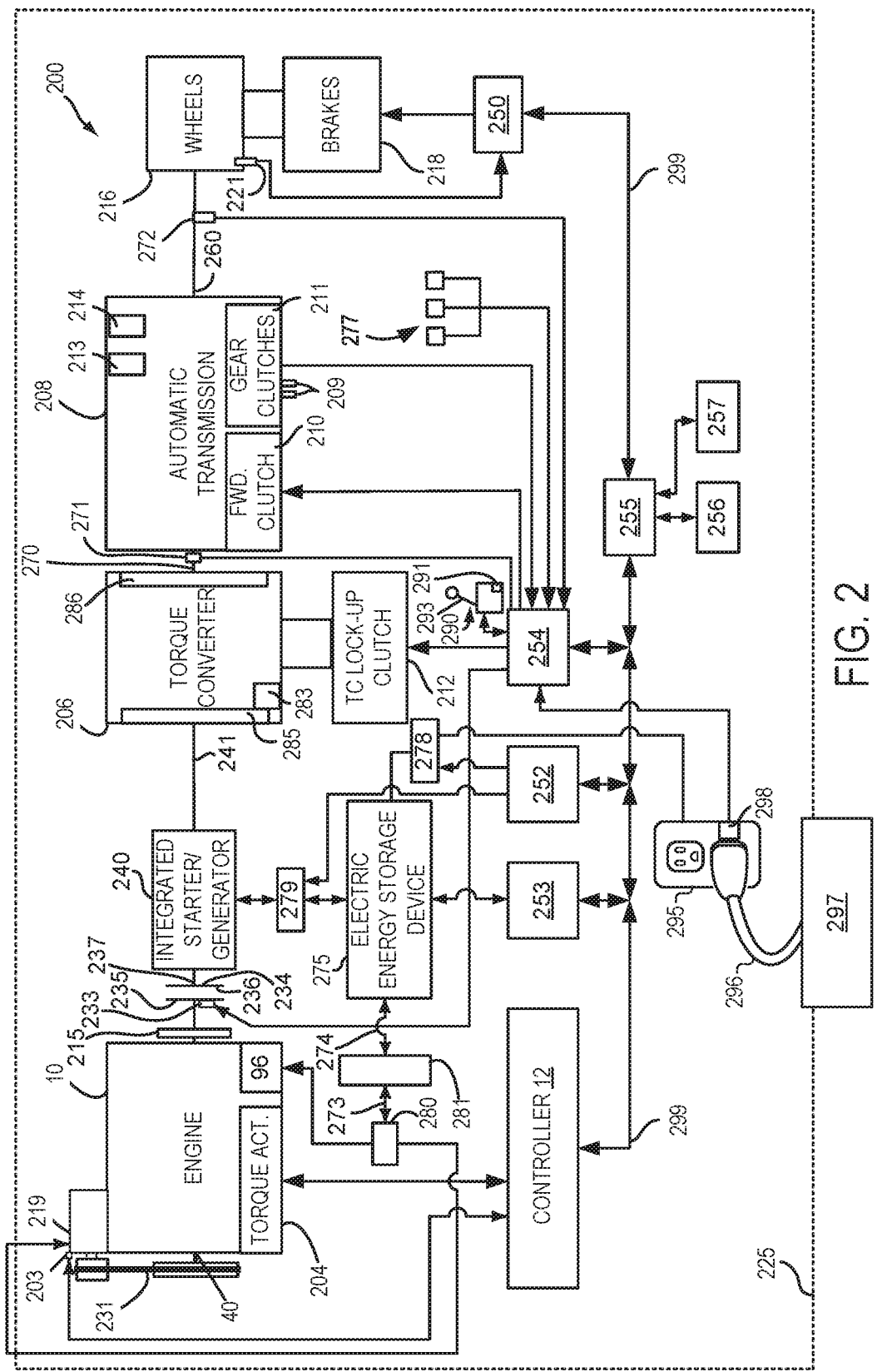
FIG. 2 shows a schematic diagram of an example vehicle driveline or powertrain including the internal combustion engine shown in FIG. 1.
Figure 3A:
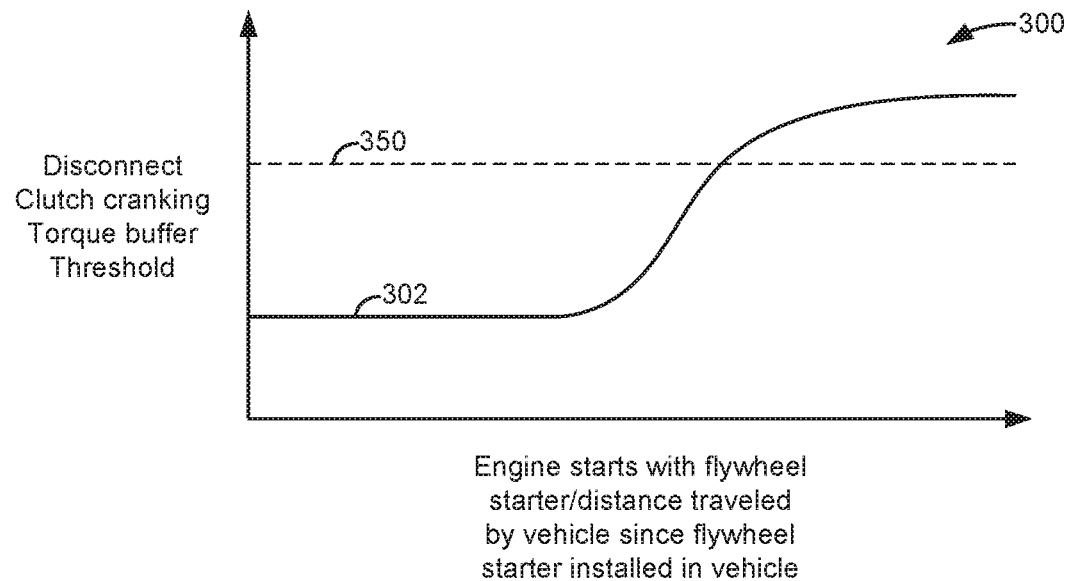
FIG. 3A shows an example function that returns a driveline disconnect clutch torque buffer threshold.
Figure 3B:
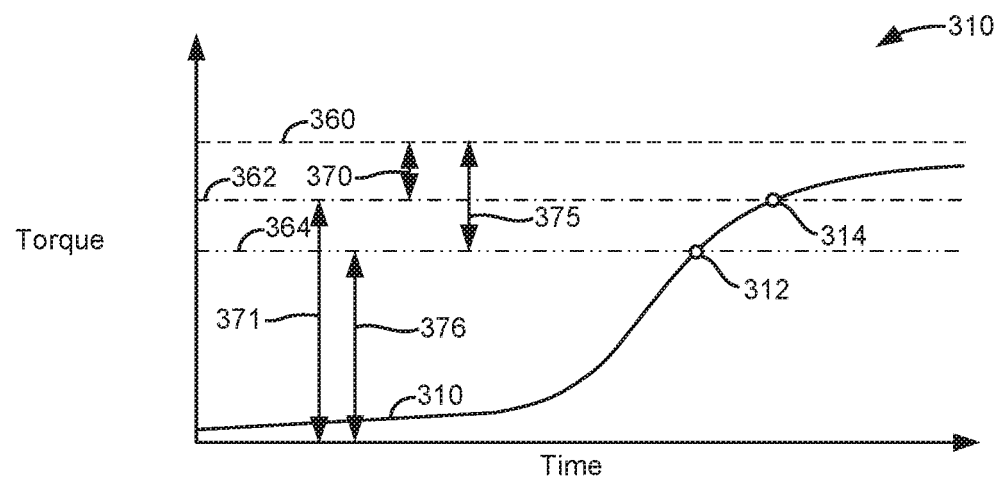
FIG. 3B shows example threshold levels for determining which electric device is to assist in engine starting.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a propulsion pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage buss 274 to a low voltage buss 273 or vice-versa. Low voltage battery 280 is electrically directly coupled to low voltage buss 273. Low voltage bus 273 may be comprised of one or more electrical conductors. Electric energy storage device 275 is electrically coupled to high voltage buss 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase speed of vehicle 225, vehicle system controller may obtain a driver demand power or power request from a propulsion pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine a rate of transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

The system of FIGS. 1 and 2 provides for a vehicle system, comprising: an internal combustion engine; an electric machine; a flywheel starter; a driveline disconnect clutch configured to selectively couple the internal combustion engine to the electric machine; and a controller including executable instructions stored in non-transitory memory that cause the controller to adjust an engine starting torque reserve responsive to operating conditions of a flywheel starter, where the engine starting torque reserve is a basis for starting the internal combustion engine via the flywheel starter and the electric machine. The vehicle system further comprises additional executable instructions to start the internal combustion engine via the flywheel starter in response to a driver demand not being less than a torque or power capacity of an electrical system minus a torque reserve for the electric machine and for the driveline disconnect clutch. The vehicle system further comprises additional executable instructions to start the internal combustion engine via the electric machine and the driveline disconnect clutch in response to a driver demand being less than a torque or power capacity of an electrical system minus a torque reserve for the electric machine and for the driveline disconnect clutch. The vehicle system includes where the engine starting torque reserve is adjusted to a maximum disconnect clutch torque capacity to crank and run-up the internal combustion engine. The vehicle system includes where the engine starting torque reserve is adjusted to a maximum disconnect clutch torque capacity for a high urgency engine start. The vehicle system further comprises additional instructions to determine the high urgency engine start based on a predicted driver demand. The vehicle system further comprises additional instructions to start the internal combustion engine responsive to the engine starting torque reserve.

Referring now to FIG. 3A, a plot of an example function that returns a driveline disconnect clutch cranking torque buffer threshold is shown. A controller may include a plurality of functions similar to function 300, one function for each transmission gear and vehicle drive mode.

Plot 300 shows a disconnect clutch cranking torque buffer threshold versus a cumulative actual total number of engine starts in which engine cranking is performed via a flywheel starter since the flywheel starter was most recently installed in the vehicle divided by a distance a vehicle has traveled since the flywheel starter was most recently installed in the vehicle. The vertical axis represents the disconnect clutch cranking torque buffer threshold and the disconnect clutch cranking torque buffer threshold increases in the direction of the vertical axis arrow. The horizontal axis represents the cumulative actual total number of engine starts in which engine cranking is performed via a flywheel starter since the flywheel starter was most recently installed in the vehicle divided by the distance a vehicle has traveled since a flywheel starter was most recently installed in the vehicle and the cumulative actual total number of engine starts in which engine cranking is performed via the flywheel starter divided by the distance a vehicle has traveled since a flywheel starter was most recently installed in the vehicle increases in the direction of the horizontal axis arrow. Horizontal line 350 represents a torque buffer threshold required to reserve sufficient torque to compensate for the disconnect clutch capacity to crank an engine under a given set of conditions (stop position, engine temperature, etc.). Trace 302 represents a relationship between the desired disconnect clutch cranking torque buffer threshold and the flywheel starter's starts/distance metric (a cumulative actual total number of engine starts in which engine cranking is performed via a flywheel starter since a flywheel starter was most recently installed in the vehicle divided by a distance a vehicle has traveled since a flywheel starter was most recently installed in the vehicle).

It may be observed that as the cumulative total number of engine starts via the flywheel increase, the disconnect clutch cranking torque buffer threshold increases. As the torque buffer threshold increases above horizontal line 350, it increases the possibility of starting the engine via the ISG and the driveline disconnect clutch while providing compensation with the ISG.

Referring now to FIG. 3B, a plot of example threshold levels for determining which electric device is to assist in starting the engine is shown. Plot 310 includes a vertical axis that represents ISG torque and ISG torque increases in the direction of the vertical axis arrow. The horizontal axis represents time and time increases from the left side of the figure to the right side of the figure. Horizontal line 360 is a threshold representing a maximum amount of torque that can be delivered by the ISG based on torque or power limitations for what can be delivered via the vehicle's electrical system (e.g., battery, ISG, inverter, etc.).

The ISG torque difference indicated by arrow 370 represents the amount of ISG torque that may be reserved to provide a smooth, compensated start with the flywheel starter. It may, in some instances, be protecting for some amount of disconnect clutch capacity that will be used to aid the engine runup after cranking with the flywheel starter. As a result, line 362 represents the torque demand threshold to trigger an engine start if the flywheel starter is the desired start device; it represents a maximum amount of torque or power that may be delivered through the ISG and the vehicle's electrical system minus the ISG torque required to start the engine when the flywheel starter is used. It is therefore a maximum amount of driver demand torque that may be delivered to propel the vehicle before the internal combustion engine is requested to be started via the flywheel starter. (note: 371 indicates the level of line 362)

The ISG torque difference indicated by arrow 375 represents the amount of ISG torque that may be reserved to provide a smooth, compensated start with the disconnect clutch. As a result, line 364 represents the torque demand threshold to trigger an engine start if the disconnect clutch is the desired start device; it represents a maximum amount of torque or power that may be delivered through the ISG and the vehicle's electrical system minus the ISG torque required to start the engine with the disconnect clutch. It is therefore a maximum amount of driver demand torque that may be delivered to propel the vehicle before the internal combustion engine is requested to be started via the disconnect clutch. (note: 376 indicates the level of line 364)

Curve 310 represents an example driver demand torque. In this example, the driver demand torque increases as time increases. The engine may be requested to start via the driveline disconnect clutch and the ISG if starting the engine via the ISG and driveline disconnect clutch is being protected when driver demand reaches point 312. The engine may be requested to start via the flywheel starter if starting the engine only via flywheel starter is being protected when driver demand reaches point 314. It is possible for curve 310 to represent an anticipated demand by extrapolating the demand into the future.

In this way, torque or power capacity of the vehicle's electrical system may be reserved for starting the engine solely via the flywheel starter or via the driveline disconnect clutch and the ISG. The remaining amount of torque or power of the vehicle's electric system may be used to propel the vehicle or for other vehicle functions.

Figure 4A:
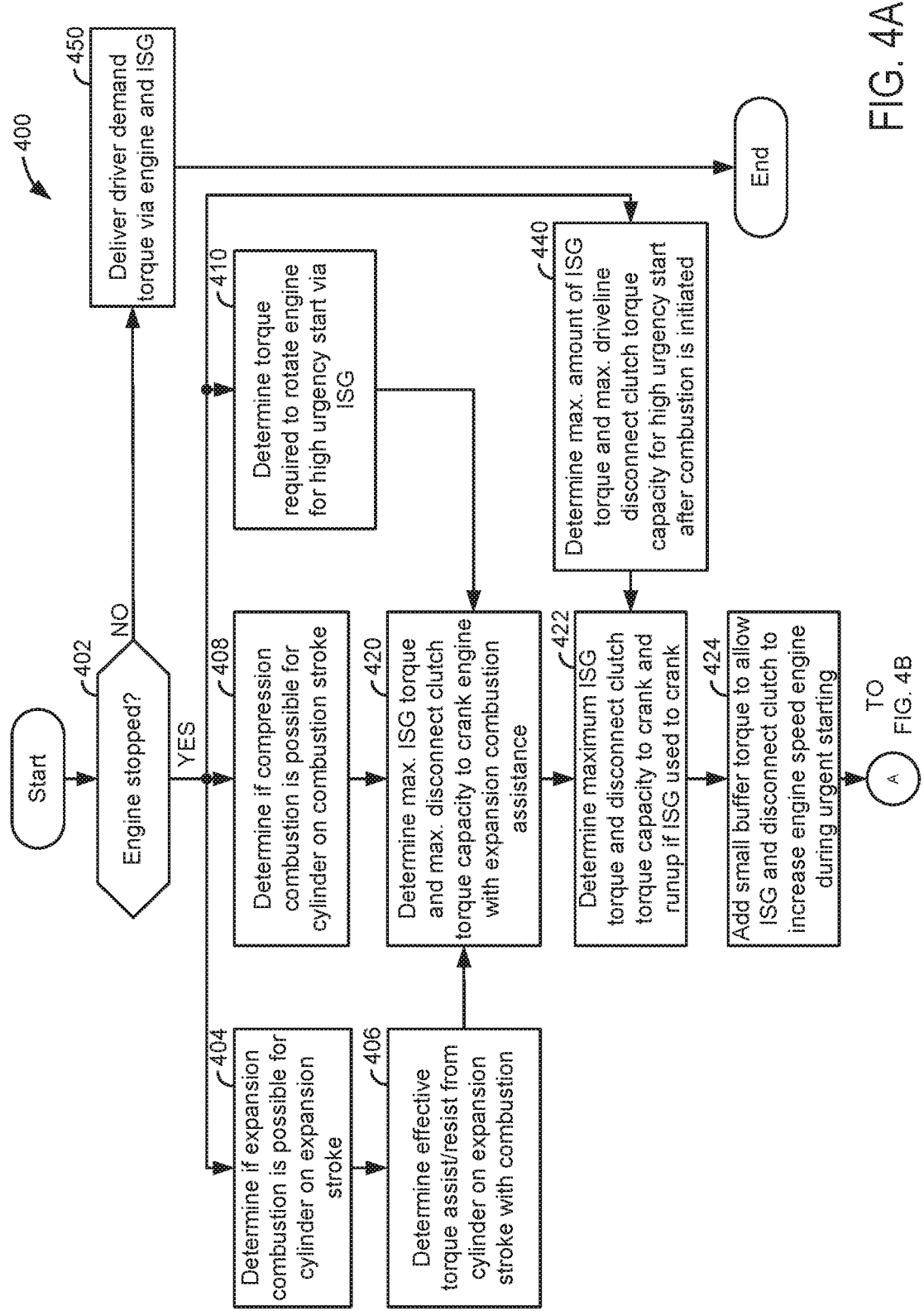
FIGS. 4A and 4B show a flowchart of an example method for determining a torque reserve for engine starting.
Figure 4B:
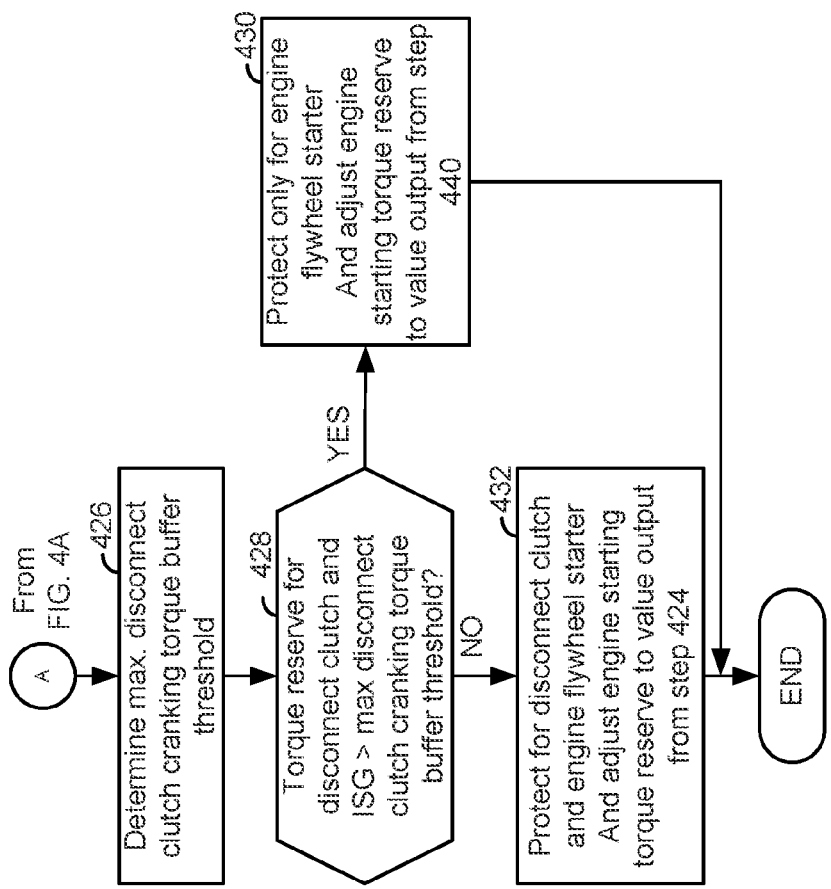

Referring now to FIGS. 4A and 4B, a method for determining a torque reserve for an electric machine is shown. The torque reserve is an amount of torque that may be expected to start an internal combustion engine. At least portions of method 400 may be implemented as executable controller instructions stored in non-transitory memory. Method 400 may operate in cooperation with the system of FIGS. 1 and 2 along with method 500. Additionally, portions of method 400 may be actions taken in the physical world to transform an operating state of an actuator or device. The method of FIG. 4 may be incorporated into the system of FIGS. 1 and 2 as executable instructions stored in non-transitory memory.

At 402, method 400 judges if the engine is stopped (e.g., not rotating). Method 400 may judge that the engine is stopped when a pulse train is not output from the engine position sensor. If method 400 judges that the engine is stopped, the answer is yes and method 400 proceeds to 404, 408, 410, and 440. Otherwise, the answer is no and method 400 proceeds to 450.

At 450, method 400 delivers a driver demand torque via the engine and the ISG. In one example, method 400 determines driver demand torque according to a position of a propulsion pedal. Method 400 commands the engine to provide a percentage of the driver demand torque. Method 400 also commands the ISG to output a percentage of the driver demand torque. Alternatively, the ISG may be commanded to consume torque from the driveline and charge a battery or other electric energy storage device. Method 400 proceeds to exit.

At 404, method 400 determines if expansion combustion is possible for a cylinder of the engine that is on an expansion stroke when the engine is stopped. Expansion combustion is combustion that is initiated in a cylinder that is on an expansion stroke when the engine is not rotating. Combustion may be initiated via injecting fuel to the cylinder that is on its expansion stroke and combusting an air-fuel mixture that is formed in the cylinder via a spark generated via a spark plug. The expansion combustion may help to generate torque to rotate the engine crankshaft, thereby reducing engine cranking torque and cranking time (e.g., an amount of time that the engine's crankshaft is rotated via an electric machine under power of the electric machine).

In one example, method 400 references a table or function that outputs a value greater than zero if expansion combustion is possible at the present engine operating conditions. The table or function outputs a value of zero if expansion combustion is not possible at the present engine operating conditions. The table or function may be referenced by engine stopping position (e.g., crankshaft angle), present engine fuel rail pressure, present engine temperature, and present barometric pressure. The expansion combustion possibility may be determined via the following equation:

$$\text{Exp\_comb} = f(\text{eng\_}p, \text{eng\_}t, \text{bp}, \text{Frp})$$

where Exp_comb is a variable that represents a reduction in a cranking torque requirement due to expansion combustion within the engine, f is a function that returns a value of the reduction in the cranking torque requirement, eng_p is the engine stop position in crankshaft degrees, eng_t is the present engine temperature, bp is the present barometric pressure, and Frp is the present fuel rail pressure. A value of zero for Exp_comb indicates that there is no impact from expansion combustion. In other words, if the value of Exp_comb is zero, expansion combustion should not be performed.

Values in the table or function f may be empirically determined via measuring engine torque and attempting expansion combustion at a variety of engine stopping positions, at a variety of barometric pressures, at a variety of fuel rail pressures, and at a variety of engine temperatures. Of course, fuel injection timing and spark timing for the engine at these varying conditions may be adjusted while attempting to start the engine via expansion combustion. Method 400 proceeds to 406.

At 406, method 400 determines an effective amount of torque or resistance to motion that the cylinder on the expansion stroke may provide. In one example, torque generated at 404 during the various engine starting conditions may be recorded and stored to memory. Method 400 may look-up a torque value that is stored in controller memory using the engine position, fuel injection timing, ignition timing, barometric pressure, fuel rail pressure, and engine temperature applied at 404 to determine an effective amount of torque or resistance that may be expected to be generated via the expansion stroke combustion.

In one example, method 400 references a table or function that outputs a value of torque or resistance that may be expected from expansion combustion. The table or function may be referenced by engine stopping position (e.g., crankshaft angle), present engine fuel rail pressure, present engine temperature, and present barometric pressure. The expansion combustion torque or resistance may be determined via the following equation:

$$\text{Exp\_c\_tor}=fn(\text{eng\_}p,\text{eng\_}t,\text{bp},\text{Frp},\text{spk\_}t))$$

where Exp_c_tor is a variable that represents the reduction in required cranking torque due to the ability to achieve helpful expansion combustion torque for the cylinder(s) that are stopped on their expansion stroke, fn is a function that returns real number value of engine torque that may be generated via expansion combustion from the engine cylinder that is stopped on its expansion stroke, and spk_t is engine spark timing. This value of Exp_c_tor may be zero if expansion combustion is not possible based on the engine conditions. Values in the function fn may be determined via starting and attempting to start an engine while measuring engine torque during the starts and starting the engine from various crankshaft positions at which the engine has stopped, starting the engine with a range of barometric pressures, starting the engine with a range of fuel rail pressures, and starting the engine with a range of engine temperatures and spark timings. Method 400 proceeds to 420.

At 408, method 400 determines if compression combustion is possible for a cylinder of the engine that is on an expansion stroke when the engine is stopped. Compression combustion is combustion that is initiated in a cylinder when the engine is rotating after the engine had been stopped rotating on its compression stroke, possibly starting from a position after intake valve close. Combustion may be initiated via injecting fuel to the cylinder that is on its compression stroke and combusting an air-fuel mixture that is formed in the cylinder via a spark generated via a spark plug after the engine has started rotating so that the resulting torque from cylinder pressure helps the engine rotate forward. The compression combustion helps to generate torque to rotate the engine crankshaft, thereby reducing the required external engine cranking torque and/or cranking time (e.g., an amount of time that the engine's crankshaft is rotated via an electric machine under power of the electric machine) to meet the same engine start performance In one example, method 400 references a table or function that outputs a value greater than zero if compression combustion is possible at the present engine operating conditions. The table or function outputs a value of zero if compression combustion is not possible at the present engine operating conditions. The table or function may be referenced by engine stopping position (e.g., crankshaft angle), present engine fuel rail pressure, present engine temperature, and present barometric pressure. The compression combustion possibility may be determined via the following equation:

$$\text{Comp\_c\_tor}=fx(\text{eng\_}p,\text{eng\_}t,\text{bp},\text{Frp})$$

where Comp_c_tor is a variable that represents the reduction in required cranking torque due to the ability to achieve combustion and whether or not compression combustion is possible for a cylinder that is stopped on its compression stroke, fx is a function that returns a value that indicates the possibility of compression combustion for an engine cylinder, eng_p is the engine stop position in crankshaft degrees, eng_t is the present engine temperature, bp is the present barometric pressure, and Frp is the present fuel rail pressure. The function fx returns a value of zero when compression combustion is not possible at the start.

Values in the table or function fx may be empirically determined via measuring engine torque while attempting compression combustion at a variety of engine stopping positions, at a variety of barometric pressures, at a variety of fuel rail pressures, and at a variety of engine temperatures. Of course, fuel injection timing and spark timing for the engine at these varying conditions may be adjusted while attempting to start the engine via compression combustion. Method 400 proceeds to 420.

At 410, method 400 estimates the amount of torque it will take to rotate the engine crankshaft via the ISG and the driveline disconnect clutch at a speed for a high urgency engine start. In one example, method 400 may estimate an amount of torque to rotate the engine crankshaft via a table or function. The table or function may hold empirically determined ISG torque values or driveline disconnect clutch torque capacity values (e.g., an amount of torque that the driveline disconnect clutch may transfer when a particular pressure is applied to the driveline disconnect clutch) for rotating the engine at a speed for a high urgency engine start. The amount of torque to rotate the engine crankshaft at a speed for a high urgency engine start may be determined via the following equation:

$$\text{Eng\_crk\_}T\text{\_high}=fa(\text{eng\_}p,\text{eng\_}t,\text{bp},\text{Frp},\text{crp})$$

where eng_crk_T_high is engine cranking torque for a high engine starting urgency level, fa is a function that returns an engine cranking torque for an engine start that its highly urgent, eng_p is the engine stop position in crankshaft degrees, eng_t is the present engine temperature, bp is the present barometric pressure, Frp is the present fuel rail pressure, and crp is an operating state of a compression relief valve, if present. Values in the function fa may be empirically determined via driving a vehicle, starting the vehicle's engine when driver demand is increasing, and adjusting the amount of torque transferred through the driveline disconnect clutch and the amount of torque provided by the ISG (e.g., 240) until a desired level of vehicle speed change is provided while starting the engine. Method 400 proceeds to 420.

At 420, method 400 determines a maximum torque capacity for the driveline disconnect clutch and the maximum ISG torque to rotate the engine during a high urgency engine start based on the engine position, temperature, barometric pressure ability to use a compression relief device. In one example, method 400 may determine the maximum torque for the ISG to start the engine during a high urgency engine start according to the following equation:

$$\text{Em\_}tr\text{\_high}=\text{Eng\_crk\_}T\text{\_high}(\text{eng\_}p,\text{eng\_}t,\text{bp},\text{Frp},\text{crp})-\text{Exp\_c\_tor}(\text{eng\_}p,\text{eng\_}t,\text{bp},\text{Frp},\text{spk\_}t)-\text{Comp\_c\_tor}(\text{eng\_}p,\text{eng\_}t,\text{bp},\text{Frp})$$

where Em_tr_high is the maximum electric machine torque and the maximum driveline disconnect clutch torque capacity that is available to crank the engine for an impending high urgency engine start, Eng_crk_T_high is the engine cranking torque for high engine starting urgency (e.g. torque required to rotate engine 200 crank degrees in less than 250 ms) in the absence of combustion in cylinders stopped on the expansion and compression strokes, Exp_comb_Tor is a function that outputs the reduction in cranking torque required based on the ability to achieve the expansion combustion, crk_pos is engine crankshaft position, afr is air-fuel ratio for compression or expansion combustion, spk_t is spark timing for expansion or compression combustion, and C_comb_Tor is a function that outputs torque generated via compression combustion. Method 400 proceeds to 422.

At 440, method 400 determines a maximum amount of ISG torque and a maximum driveline disconnect clutch torque capacity that is desired for a high urgency engine start after combustion has been initiated in the engine. The maximum amount of ISG torque that is desired for the high urgency engine start and the maximum driveline disconnect clutch torque capacity may be applied during engine run-up (e.g., the time beginning after a predetermined total number of combustion events in the engine since the most recent engine stop up to a time when the engine reaches a predetermined speed, such as synchronous speed with the ISG). In one example, the maximum ISG torque to run the engine up and the maximum driveline disconnect clutch torque capacity that is desired to run the engine up may be determined via the following equation:

$$\text{Run\_hi\_Tor} = fc(\text{ISG\_}n, \text{Drv\_mod}, \text{Gear})$$

where Run_hi_torque is the maximum ISG torque and maximum driveline disconnect clutch torque capacity that is available to run the engine up to a predetermined speed, fc is a function that returns the maximum ISG torque that is available during engine run-up to the predetermined speed, ISG_n is the present ISG rotational speed, Drv_mod is the present driver selected driveline mode, and Gear is the presently engaged transmission gear. Values in the function fc may be empirically determined via starting an engine while the ISG is rotating over a range of speeds, with the transmission engaged in a range of gears, and with the driveline in various modes. For example, engine run-up torque may be measured when ISG speed is 400 RPM and the vehicle's transmission is engaged in second gear. Engine run-up torque may also be measured when ISG speed is 600 RPM and the vehicle transmission is engaged in third gear. Engine run-up torques at these conditions may be a basis for values stored in the fc function. Method 400 proceeds to 422.

At 422, method 400 determines the maximum ISG torque and a maximum torque capacity of the driveline disconnect clutch that may be applied to crank the engine and run the engine up to speed of the ISG. Method 400 may determine the maximum ISG torque during engine cranking and engine run-up via the following equation:

$$\text{Max\_crk\_run} = \max(\text{Run\_hi\_Tor}, \text{Em\_}tr\text{\_high})$$

where Max_crk_run is a maximum ISG torque and the maximum driveline disconnect clutch torque capacity that is available to crank (e.g., rotate the engine via an electric machine at a speed for starting the engine) and run-up the engine, max is a function that returns a greater of argument 1 and argument 2 (e.g., max(argument 1, argument 2)), Run_hi_Tor is the maximum ISG torque during run-up, and Em_tr_high is the maximum ISG torque during engine cranking. The maximum ISG and maximum driveline disconnect clutch torque capacity that is available to crank and run-up the engine may also be referred to as a driveline disconnect clutch cranking and run-up buffer torque. Method 400 proceeds to 424.

At 424, method 400 determines a torque reserve for the ISG and for the driveline disconnect clutch. Method 400 adds a predetermined amount of torque (e.g., an offset) to the Max_crk_run torque that is determined at 422 to determine the ISG torque reserve and the driveline disconnect clutch torque capacity reserve. The ISG torque reserve and the driveline disconnect clutch torque capacity reserve may be described via the following equation:

$$\text{ISG\_}T\text{\_res} = \text{Max\_crk\_run} + \text{offset\_crk\_run}$$

where ISG_T_res is a ISG torque reserve and the driveline disconnect clutch torque capacity reserve for starting the engine, Max_crk_run is the maximum ISG torque as determined at 422, and offset_crk_run is a predetermined offset torque value (e.g., 30 Newton-meters) to ensure that the engine speed may be increased at a desired rate during engine cranking and run-up. The ISG torque reserve is ISG torque that may not be applied to generate propulsive effort (e.g., wheel torque) and that may be used only to start the engine.

In addition, the amount of torque in variable ISG_T_res may be an amount of torque that is included in a total torque capacity or a rated torque of the ISG and that may be used as a an engine starting threshold if starting the engine via the electric machine and the driveline disconnect clutch is being protected. For example, if the ISG has a total torque output capacity of 200 Newton-meters and engine cranking and run-up requires 50 Newton-meters of torque, then the engine may be started via the ISG when the ISG torque output exceeds 150 Newton-meters. Method 400 proceeds to 426 of FIG. 4B after the ISG torque reserve is determined.

At 426, method 400 determines a maximum driveline disconnect clutch cranking torque buffer threshold. The disconnect clutch cranking torque buffer threshold is maximum amount of torque that the engine starting system may reserve to use the driveline disconnect clutch and the ISG to start the engine. The disconnect clutch cranking torque buffer threshold may be dependent on use of the flywheel starter. For example, the greater number of times that the flywheel starter is applied to start the engine, the greater amount of torque may be allocated to the disconnect clutch cranking torque buffer. And, the greater the value of the driveline disconnect clutch cranking torque buffer threshold, the greater the possibility may be for selecting the driveline disconnect clutch to start the engine at 506 of method 500.

In one example, method 400 may determine the maximum disconnect clutch cranking torque buffer threshold via a table or function. The table or function may hold empirically determined disconnect clutch cranking torque buffer threshold values. The disconnect clutch cranking torque buffer threshold may be determined via the following equation:

$$\text{DIS\_crk\_}T\text{\_buff\_thresh} = fdis\_crk(\text{Cm\_FW\_st}, \text{Cm\_dis\_FW}, \text{Gear}, \text{Vs}, \text{Drv\_mod})$$

where DIS_crk_T_buff_thresh is the disconnect clutch cranking torque buffer threshold value, fdis_crk is a function that returns a driveline disconnect clutch cranking torque buffer threshold, Cm_FW_st is an actual cumulative total number of engine starts provided by the engine's flywheel starter (e.g., 96) since a time when the flywheel starter was installed in the vehicle, Cm_dis_FW is an actual cumulative total distance traveled by the vehicle that includes the engine that is being started since a new flywheel starter was installed in the vehicle, Gear is the presently engaged transmission gear, Vs is vehicle speed, and Drv_mod is the present driver selected driveline mode. Values in the function fdis_drk may be empirically determined via performing engine starts over a course of vehicle driving and adjusting the values so that the maximum driveline disconnect clutch cranking torque buffer threshold increases as the cumulative total number of engine starts provided via the flywheel starter increases. The function may have the shape shown in FIG. 3A, and the function fdis_crk may output values based on a ratio of Cm_FW_st/Cm_dis_FW. Method 400 proceeds to 428.

At 428, method 400 determines if the torque reserve for the ISG and for the driveline disconnect clutch (output of 424 (ISG_T_res)) is greater than the maximum driveline disconnect clutch cranking torque buffer threshold (output of 426 (DIS_crk_T_buff_thresh)). If so, the answer is yes and method 400 proceeds to 430. Otherwise, the answer is no and method 400 proceeds to 432.

At 430, method 400 protects only for starting the engine via the engine flywheel starter (e.g., 96 of FIG. 1) by setting the demand threshold to trigger an engine start as represented by line 362 in FIG. 3B. In other words, the power output of the vehicle's electrical system (e.g., power output from an electric energy storage device/battery, electric energy power conversion devices (e.g., inverters), and electric machines (e.g., ISG 240)) that is reserved for engine starting may be sufficient to crank the engine via the flywheel starter and insufficient to crank and start the engine via the driveline disconnect clutch and the ISG. The engine may be started only via the flywheel starter and not via the ISG when method 400 is at 430. Method 400 adjusts the engine starting torque reserve to the value output from step 424 (e.g., the maximum amount of ISG torque and a maximum driveline disconnect clutch torque capacity that is desired for a high urgency engine start via the flywheel starter). Method 400 proceeds to exit.

At 432, method 400 protects for starting the engine via the ISG and the disconnect clutch. Method 400 also protects for starting the engine via the engine flywheel starter by setting the demand threshold to trigger an engine start as represented by line 364 in FIG. 3B. In other words, the power output of the vehicle's electrical system (e.g., power output from an electric energy storage device/battery, electric energy power conversion devices (e.g., inverters), and electric machines (e.g., ISG 240)) that is reserved for engine starting may be sufficient to crank the engine via either starting device by compensating for the higher torque required for the disconnect clutch. Method 400 adjusts the engine starting torque reserve to the value output from step 440 (e.g., (e.g., the maximum amount of ISG torque and a maximum driveline disconnect clutch torque capacity that is desired for a high urgency engine start via the disconnect clutch). Method 400 proceeds to exit.

In this way, method 400 may dynamically adjust the engine starting buffer threshold. The engine starting buffer threshold may be adjusted to increase or decrease the possibility of starting the engine via the driveline disconnect clutch and the ISG. In one example, the possibility of starting the engine via the driveline disconnect clutch and ISG may be increased via increasing the value of the engine starting buffer threshold.

Figure 5A:
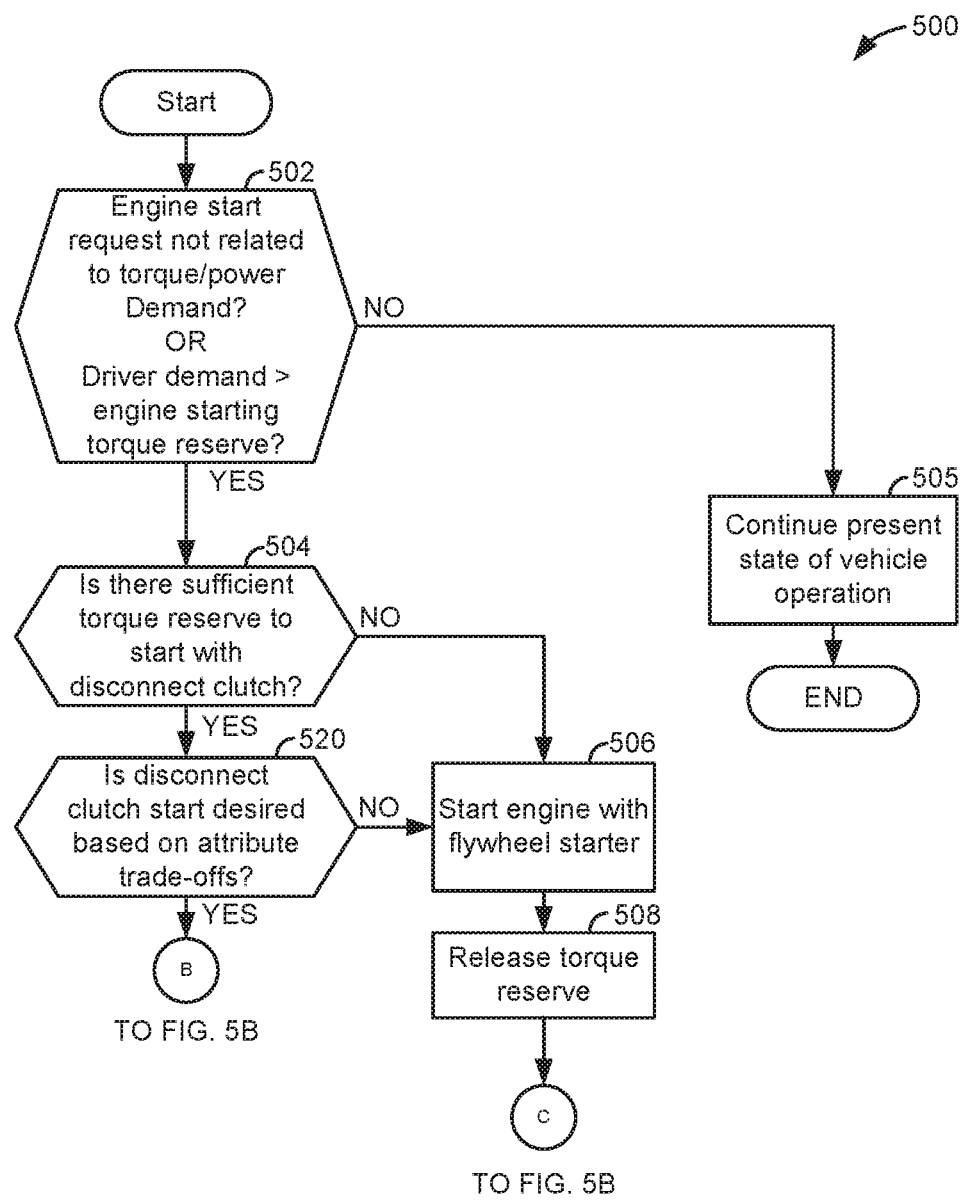
FIGS. 5A and 5B shows a flowchart of an example method for starting an engine.
Figure 5B:
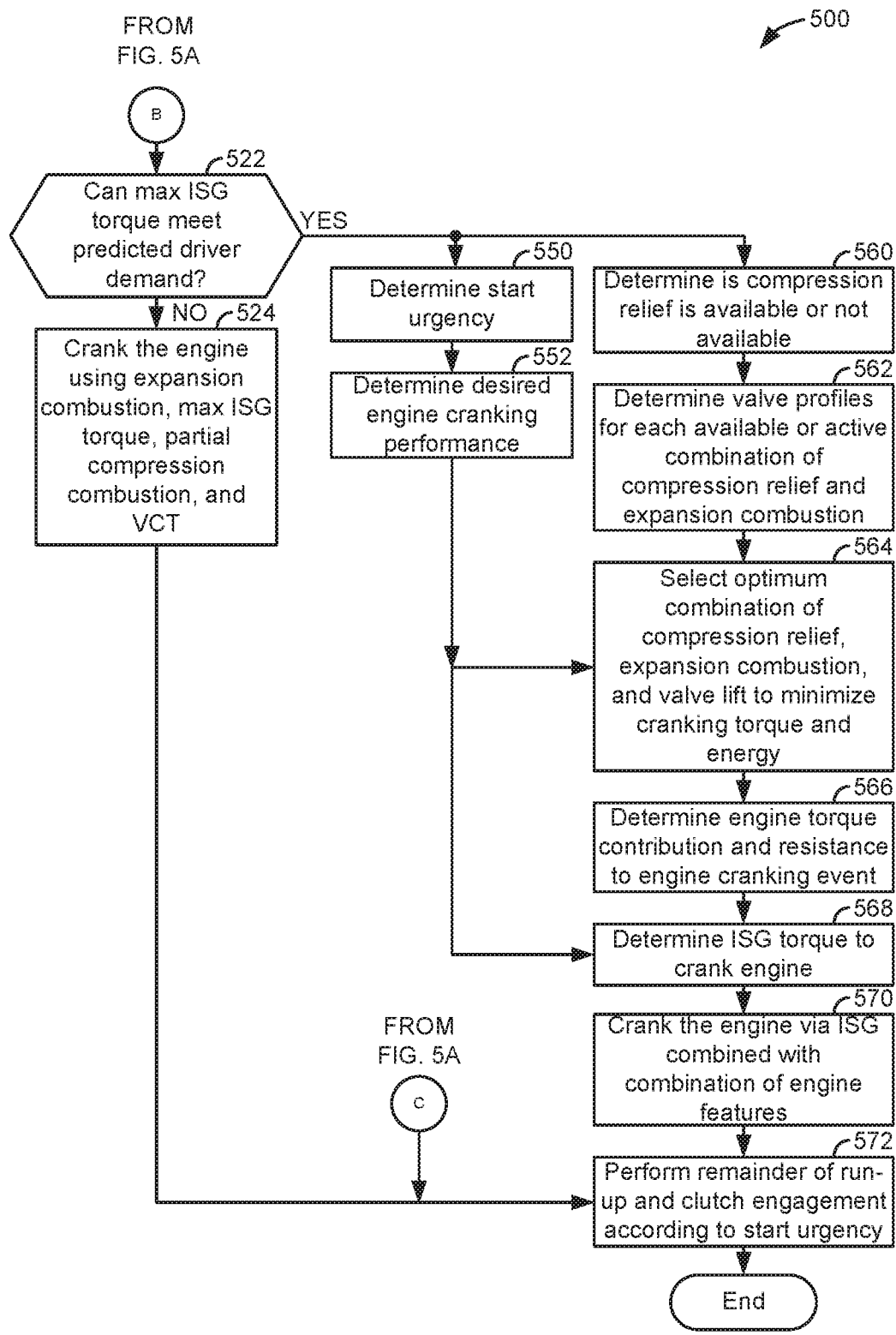
Figure 6:
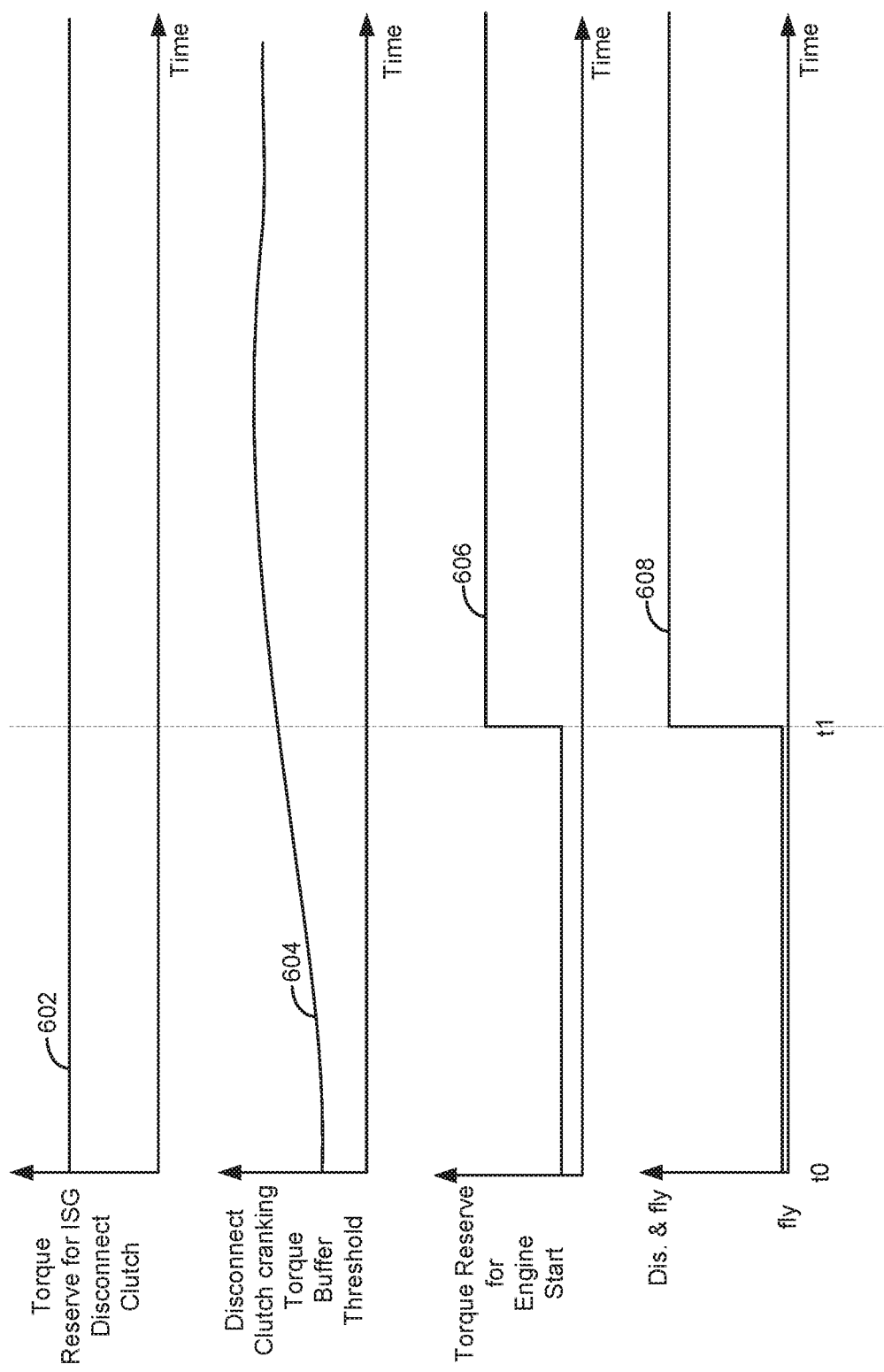
FIG. 6 shows an example sequence where engine starting device selection is performed.

Referring now to FIGS. 5A and 5B, a method for starting an engine via applying the engine starting buffer threshold for the electric machine (e.g., ISG 240) and the driveline disconnect clutch is shown. At least portions of method 500 may be implemented as executable controller instructions stored in non-transitory memory. Method 500 may operate in cooperation with the system of FIGS. 1 and 2 along with method 400. Additionally, portions of method 500 may be actions taken in the physical world to transform an operating state of an actuator or device. The method of FIGS. 5A and 5B may be incorporated into the system of FIGS. 1 and 2 as executable instructions stored in non-transitory memory.

At 502, method 500 judges if an engine start is requested that is not related to driver demand or if driver demand torque is equal to, or exceeds, the maximum torque or power output of the vehicle electric system (e.g., power output from an electric energy storage device/battery, electric energy power conversion devices (e.g., inverters), and electric machines (e.g., ISG 240)) minus the engine start buffer torque threshold that is determined at 430 or 432. For example, an engine start may be requested via a battery controller requesting an increase in battery SOC. If method 500 judges that the engine start is not related to driver demand or if driver demand torque is equal to, or exceeds, the maximum torque or power output of the vehicle electric system (e.g., power output from an electric energy storage device/battery, electric energy power conversion devices (e.g., inverters), and electric machines (e.g., ISG 240)) minus the engine start buffer torque threshold that is determined at 430 or 432 (e.g., the engine starting torque reserve), the answer is yes and method 500 proceeds to 504. Otherwise, the answer is no and method 500 proceeds to 505.

At 505, method 500 continues vehicle operation according to the vehicle's present state. For example, if the vehicle is being propelled solely via the ISG, the ISG continues to propel the vehicle. If the vehicle is deactivated, the vehicle may continue to be deactivated. Method 500 proceeds to exit.

At 504, method 500 judges if there is sufficient torque reserve available to start the engine via the driveline disconnect clutch and the ISG. In one example, method 500 may determine whether or not there is sufficient torque reserve available to star the engine via the following logic: If DD<Ele_max_T−ISG_T_res, where ISG_T_res is the ISG torque reserve as determined at 424, Ele_max is the maximum torque or power that may be delivered via the vehicle electric system at the present speed of the ISG, and DD is the driver demand. In this example, all torques described are in terms of transmission assembly input or ISG torque. If method 500 judges that there is sufficient torque reserve available to start the engine via the drive line disconnect clutch and the ISG, the answer is yes and method 500 proceeds to 520. Otherwise, the answer is no and method 500 proceeds to 506.

At 506, method 500 starts the engine via the flywheel starter (e.g., 96 of FIG. 1). The engine is cranked via the starter and the engine speed increases to the speed of the ISG after the engine is started. The driveline disconnect clutch is closed after the engine's speed reaches speed of the ISG so that engine torque may be delivered to the vehicle's wheels. Method 500 proceeds to 508.

At 508, method 500 reduces the ISG torque reserve by adjusting it to zero. Similarly, method 500 reduces the driveline disconnect clutch torque reserve to zero. These actions allow the ISG to assist the engine with its full torque/power capacity. Method 500 proceeds to 572. At 520, method 500 judges if a driveline disconnect clutch based engine start (e.g., where the engine is started via closing the driveline disconnect clutch and rotating the engine via the ISG) is desired based on attribute trade-offs. Attribute trade-offs may include but are not limited to vehicle noise and vibration being less than a threshold. For example, at the present ISG speed, engine starting vibration is expected to be less than a threshold level of vibration, the answer is yes and method 500 proceeds to 522. If method 500 judges that a driveline disconnect clutch based engine start is desired based on attribute trade-offs, the answer is yes and method 500 proceeds to 522. Otherwise, the answer is no and method 500 proceeds to 506.

At 522, method 500 judges whether or not the ISG may meet the predicted driver demand torque at a predetermined amount of time in the future from the present time while cranking and running up the engine. In one example, method predicts the driver demand a predetermined amount of time in the future via extrapolating the present driver demand torque and a past driver demand torque. For example, method 500 determines the rate if change of the driver demand torque via the following equation:

$$DD\_slope=(DDt2-DDt1)/(t2-t1)$$

where DD_slope is the driver demand torque slope or rate of change, DDt2 is driver demand torque at the present time, DDt1 is driver demand torque at the last previous driver demand sample time, t2 is the present driver demand sample time, and t1 is the last previous driver demand sample time. After the driver demand slope is determined, driver demand may be extrapolated to a predetermined time in the future (e.g., 0.5 seconds from the present time) via the following equation:

$$DD\_pre=DD\_present+DD\_slope\cdot DD\_ex\_t$$

where DD_pre is the predicted driver demand torque, DD_present is the present driver demand torque, DD_slope is the rate of change in driver demand torque, and DD_ex_t is the amount of time in the future to extrapolate the driver demand torque. For example, if the present driver demand torque is 150 Newton-meters, the driver demand slope is 5 Newton-meters/second, and the amount of time to extrapolate driver demand in the future is 0.5 seconds, then the predicted driver demand torque=150+(5*0.5)=152.5.

The predicted driver demand torque may be added to the ISG torque reserve or to the amount of torque to be supplied by the ISG to crank and run-up to determine if the ISG may meet the predicted driver demand torque at a predetermined amount of time in the future from the present time while cranking and running up the engine. For example, method 500 may judge that the ISG may provide the predicted driver demand torque and torque to crank and run-up the engine if DD_pre+ISG_T_res<Ele_max_T, where Ele_max_T is the maximum electric system torque or power output capacity at the present ISG speed. If method 500 judges that the ISG may meet the predicted driver demand torque at a predetermined amount of time in the future from the present time while cranking and running up the engine, then the answer is yes and method 500 proceeds to 550 and 560. Otherwise, the answer is no and method 500 proceeds to 524. Method 500 may judge that the engine starting urgency is not a high urgency when the ISG may meet the predicted driver demand torque at the predetermined amount of time in the future while cranking the engine. Method 500 may judge that the engine starting urgency is a high urgency when the ISG may not meet the predicted driver demand torque at the predetermined amount of time in the future while cranking the engine.

At 524, method 500 cranks the engine (e.g., rotates the engine at a predetermined cranking speed, such as 250 RPM or ISG speed) via closing the driveline disconnect clutch, applying expansion combustion, compression combustion, and poppet valve lift and timing for maximum engine performance. Method 500 also adjusts the torque capacity (e.g., an amount of torque that the driveline disconnect clutch may transfer) of the driveline disconnect clutch to equal the ISG torque capacity. Thus, the torque capacity of the driveline disconnect clutch may be adjusted in response to an amount of work generated via expansion combustion, behavior (e.g., operating/not operating) of compression relief valves and poppet valves during engine cranking, position at which the engine stops rotating, engine coolant temperature, engine oil temperature, and barometric pressure, all of which may be indicative of engine cranking torque. These adjustments allow the ISG and engine to respond to high urgency engine starting conditions. A higher urgency engine start may be an engine start that increases driveline noise and vibration, yet may deliver larger amounts of torque soon after an engine start request. Method 500 proceeds to 572.

At 550, method 500 determines an urgency level for the requested engine start. High urgency engine starts proceed to 524 from 522, so engine start requests that reach 550 and 560 may be low urgency or medium urgency engine starts. In one example, of the originator of a signal that is a basis for the engine start request is a human operator, then the engine start urgency is medium urgency. However, if a system component is the originator of the signal that is the basis for the engine start request, then the engine start urgency may be determined to be lower urgency. Nevertheless, some vehicle devices that are the basis for the engine start request may be the basis for adjusting engine starting urgency to a medium level. For example, an engine exhaust system temperature monitor that is the basis for an engine start request may be deemed to warrant a low engine start urgency level. Conversely, a significant change in battery state of charge in a short time period may be deemed to warrant a medium engine start urgency level. Method 500 may adjust engine start urgency levels according to the originator of the engine start request as well as rates of change of vehicle operating parameters (e.g., battery state of charge). Method 500 determines the engine start urgency level and proceeds to 552.

At 552, method 500 determines a desired engine cranking performance. The desired engine cranking performance may be based on the engine starting urgency. For example, if the engine starting urgency is low, then the engine cranking performance may be set to a low level so that longer engine cranking times may be permitted. In addition, the engine cranking speed may be a function of the engine cranking performance level. If the engine cranking performance level is low, the engine may be rotated via the ISG at a lower speed (e.g., 250 RPM). If engine cranking performance is medium, the engine may be cranked up to engine idle speed, for example. If the engine starting urgency is medium, then the engine cranking performance may be set to a medium level so that shorter engine cranking times may be provided. Method 500 proceeds to 564 and 568.

At 560, method 500 determines if one or more cylinder compression relief valves are available or not available. A compression relief valve may not be available if the cylinder compression relief valve will not change state when it is commanded to do so. In addition, a compression relief valve may not be available if the engine does not include compression relief valves. The compression relief valves may be selectively opened during engine cranking to reduce engine cranking torque, if desired. Opening the compression relief valve may allow some air to escape from engine cylinders during engine cranking so that the engine may be cranked or rotated using less torque as compared to if the compression relief valve is held closed. Method 500 proceeds to 562 after determining the availability of the compression relief valves.

At 562, method 500 determines intake and exhaust poppet valve timing and lift for each combination of compression relief valve state and expansion combustion. In one example, the controller includes predetermined intake and exhaust poppet valve opening and closing timings as well as lift amounts for conditions when a compression relief valve is present and available and when expansion combustion is possible. The corresponding engine cranking torque for these conditions is also stored in controller memory.

Method 500 also includes predetermined intake and exhaust poppet valve opening and closing timings as well as lift amounts for conditions when a compression relief valve is not present and not available and when expansion combustion is possible. The corresponding engine cranking torque for these conditions is also stored in controller memory.

Method 500 also includes predetermined intake and exhaust poppet valve opening and closing timings as well as lift amounts for conditions when a compression relief valve is present and available and when expansion combustion is not possible. The corresponding engine cranking torque for these conditions is also stored in controller memory.

Method 500 also includes predetermined intake and exhaust poppet valve opening and closing timings as well as lift amounts for conditions when a compression relief valve is not present and not available and when expansion combustion is not possible. The corresponding engine cranking torque for these conditions is also stored in controller memory. Method 500 proceeds to 564.

At 564, method 500 selects an optimum combination of the compression relief valve activation/deactivation, expansion combustion activation/deactivation, and poppet valve timings/lift to minimize engine cranking torque energy. In one example, method selects the intake and exhaust poppet valve timing/lift with the lowest engine cranking torque that meets the present engine starting urgency, expansion combustion possibility determination (e.g., possible/not possible), and compression relief valve availability (e.g., available/not available). For example, if expansion combustion has been determined possible, the engine starting urgency is medium, and the compression relief valve is not available, then method 500 selects intake and exhaust poppet valve timing/lift values that provide the lowest engine cranking torque for these operating conditions. Likewise, if expansion combustion has been determined not possible, the engine starting urgency is low, and the compression relief valve is available, then method 500 selects intake and exhaust poppet valve timing/lift values that provide the lowest engine cranking torque for these operating conditions. Method 500 proceeds to 566.

At 566, method 500 estimates the engine torque contribution and/or resistance to the present engine cranking event. In one example, method 500 estimates an engine torque contribution to engine starting according to the present volume of the cylinder that is on its expansion stroke, engine temperature, and intake/exhaust poppet valve timing/lift. In one example, the present volume of the cylinder that is on its expansion stroke, engine temperature, and intake/exhaust poppet valve timing/lift reference a table or function that outputs a torque contribution value for the present engine cranking event. Values in the table or function may be empirically determined via starting the engine and monitoring engine torque at different operating conditions. Method 500 proceeds to 568.

At 568, method 500 determines the ISG torque for cranking the engine. In one example, method 500 may determine the ISG torque according to the present engine start urgency level. When engine starting urgency is medium level, method 400 may determine a maximum torque for the ISG according to the following equation:

$$ISG\_T = DD\_present + Eng\_crk\_T\_med(eng\_p, eng\_t, bp, Frp, crp) - Exp\_c\_tor(eng\_p, eng\_t, bp, Frp, spk\_t) - Comp\_c\_tor(eng\_p, eng\_t, bp, Frp)$$

where Eng_crk_t_med is torque to crank the engine at a speed that is suitable for a medium engine starting urgency level (e.g., rotating engine by 200 crank degrees in less than 300 ms), DD_present is the present driver demand, ISG_T is the ISG torque to rotate the engine crankshaft at the speed that is suitable for a medium engine starting urgency level and provide the driver demand torque. When engine starting urgency is low level, method 400 may determine a maximum torque for the ISG according to the following equation:

$$ISG\_T = DD\_present + Eng\_crk\_T\_low(eng\_p, eng\_t, bp, Frp, crp) - Exp\_c\_tor(eng\_p, eng\_t, bp, Frp, spk\_t) - Comp\_(c\_tor(eng\_p, eng\_t, bp, Frp))$$

where Eng_crk_T_low is torque to crank the engine at a speed that is suitable for a low engine starting urgency level (e.g., 250 RPM), ISG_T is the ISG torque to rotate the engine crankshaft at the speed that is suitable for a low engine starting urgency level and provide the driver demand torque. Method 400 proceeds to 570.

At 570, method 500 cranks the engine via the ISG according to the ISG torque determined at 568 and closes the driveline disconnect clutch. Method 500 also adjusts intake and exhaust poppet valve timing, compression relief valve state, and expansion combustion activation/deactivation to minimize engine cranking torque energy and provide engine starting with the determined urgency. For example, if method 500 judged that expansion combustion has been determined possible, the engine starting urgency is medium, and the compression relief valve is not available, then method 500 selects intake and exhaust poppet valve timing/lift values that provide the lowest engine cranking torque for these operating conditions while rotating the engine at the ISG torque determined at 568. Method 500 may adjust the driveline disconnect clutch torque capacity to the value of ISG_T_res as determined at 424. Alternatively, method 500 may adjusts the torque capacity of the driveline disconnect clutch to a torque output of the ISG minus driver demand torque via adjusting a pressure that is applied to a driveline disconnect clutch. Thus, the torque capacity of the driveline disconnect clutch may be adjusted in response to an amount of work generated via expansion combustion, behavior (e.g., operating/not operating) of compression relief valves and poppet valves during engine cranking, position at which the engine stops rotating, engine coolant temperature, engine oil temperature, and barometric pressure, all of which may be indicative of engine cranking torque. Method 500 proceeds to 572.

At 572, method 500 performs the remainder of the engine start and run-up according to the engine start urgency level. For example, method 500 may adjust the rate of engine speed increase from cranking speed to ISG speed according to the engine starting urgency. In one example, method 500 may increase engine speed from cranking speed to ISG speed at a rate of X RPM/second when engine starting urgency is high. Method 500 may increase speed of the engine from cranking speed to ISG speed at a rate of Y RPM/second when engine starting urgency is medium. Method 500 may increase speed of the engine from cranking speed to ISG speed at a rate of Z RPM/second, where X>Y>Z. Method 500 proceeds to exit.

In this way, method 500 may start the engine according to an engine starting urgency level. In addition, method 500 starts or does not start an engine according to a dynamically changing threshold.

Thus, the methods of FIGS. 4A-5B provide for a method for operating a vehicle, comprising: adjusting a level of a torque or power demand (e.g., and engine starting torque reserve) that is a basis for commanding an engine start and selecting an engine start device from two or more engine starting devices; and starting the engine via a flywheel starter or via an integrated starter/generator and a driveline disconnect clutch responsive to the engine starting torque reserve. The method further comprises adjusting the level of the torque or power demand in further response to an actual total cumulative distance traveled by the vehicle since a most recent installation of the flywheel starter. The method includes where the level of the torque or power demand is further based on torque generated via expansion combustion. The method includes where the level of the torque or power demand is further based on torque generated via compression combustion. The method includes where the level of the torque or power demand increases as the actual total cumulative number of engine starts in which the flywheel starter cranks the engine increases. The method further comprises starting the engine via the flywheel starter in response to a driver demand not being less than an electrical system torque or power capacity minus the level of the torque or power demand. The method further comprises starting the engine via the driveline disconnect clutch or the flywheel starter in response to a driver demand being less than an electrical system torque or power capacity minus the level of the torque or power demand.

The method of FIGS. 4A-5B also provides for a vehicle operating method, comprising: selecting an engine starting device from a group of starting devices including a flywheel starter and an integrated starter/generator in response to sufficiency of a torque reserve for starting an engine via a driveline disconnect clutch, where the flywheel starter is selected in response to the torque reserve being insufficient to start the engine via the integrated starter/generator, and where the integrated starter/generator is selected in response to the torque reserve being sufficient to start the engine via the integrated starter/generator; and starting the engine via the selected engine starting device. The method further comprises predicting a driver demand torque from a present time to a predetermined future time. The method further comprises dynamically adjusting the torque reserve in response to operating conditions of a flywheel starter. The method includes where the operating conditions include an actual total cumulative number of engine starts performed via cranking the engine via a flywheel starter. The method includes where the operating conditions include an actual total cumulative distance traveled by a vehicle since a most recent installation of the flywheel starter. The method further comprises dynamically adjusting the torque reserve in response to a presently engaged gear of a transmission.

Referring now to FIG. 6, a prophetic sequence illustrating how selection of engine starting devices may be influenced via a dynamically adjusted maximum driveline disconnect clutch cranking torque buffer threshold is shown. The sequence of FIG. 6 may be provided via the system of FIGS. 1 and 2 in cooperation with the method of FIGS. 4A-5B. The plots are aligned in time. In this example, the torque threshold for an engine start is shown as a constant value for simplicity of illustration and illustration of concept.

The first plot is a plot of a torque reserve for the ISG and for the driveline disconnect clutch (e.g., ISG_T_res of step 424) versus time. The vertical axis represents the torque reserve for the ISG and the driveline disconnect clutch and the torque reserve increases in the direction of the vertical axis arrow. The horizontal axis represents time and time increases from the left side of the plot to the right side of the plot. Trace 602 represents the torque reserve for the ISG and the driveline disconnect clutch.

The second plot is a plot of a disconnect clutch cranking torque buffer threshold (e.g., DIS_crk_T_buff_thresh of step 426) versus time. The vertical axis represents the disconnect clutch cranking torque buffer threshold and the disconnect clutch cranking torque buffer threshold increases in the direction of the vertical axis arrow. The horizontal axis represents time and time increases from the left side of the plot to the right side of the plot. Trace 604 represents a disconnect clutch cranking torque buffer threshold.

The third plot illustrates torque reserve for starting the engine or the engine starting torque reserve. The vertical axis represents the torque reserve amount and the torque reserve amount increases in the direction of the vertical axis arrow. The horizontal axis represents time and time increases from the left side of the plot to the right side of the plot. Trace 606 represents the torque reserve amount for engine starting.

The fourth plot is a plot that indicates which engine starting device may be selected and applied to start the engine. The vertical axis indicates which engine starting device may be selected and applied to start the engine and the driveline disconnect clutch. The driveline disconnect clutch and ISG or the fly wheel starter may be applied to start the engine when trace 608 is at a higher level near the label "Dis. & fly." Only the fly wheel starter may be applied to start the engine when trace 608 is at a lower level near the label "fly."

At time t0 the torque reserve for the ISG and for the driveline disconnect clutch is at a higher level and the disconnect clutch cranking torque buffer threshold is at a lower level. Since the disconnect clutch cranking torque buffer threshold is less than the torque reserve for the ISG and for the driveline disconnect clutch, the driveline disconnect clutch and the flywheel starter are available to start the engine. The torque reserve for starting the engine is at a lower level, which is suitable for starting the engine via the flywheel starter.

Between time t0 and time t1, the disconnect clutch cranking torque buffer threshold increases as conditions of the flywheel starter change. Prior to t1, for a gradual increase in torque demand, only the flywheel starter is available to start the engine. This condition may occur when block 428 of FIG. 4 yields YES and method 400 proceeds to block 430.

At time t1, the disconnect clutch cranking torque buffer threshold exceeds the torque reserve for the ISG and for the driveline disconnect clutch. The condition where the disconnect clutch cranking torque buffer threshold exceeds the torque reserve for the ISG disconnect clutch may occur when block 428 of FIG. 4 yields a NO answer and method 400 moves to 432. This causes the torque reserve for engine starting to be increased so that the ISG and disconnect clutch may be applied to start the engine, or alternatively, the flywheel starter may be used to start the engine.

In this way, a dynamically changing disconnect clutch cranking torque buffer threshold may affect selection of an engine starting device. The disconnect clutch cranking torque buffer threshold may change as a function of flywheel starter operating conditions so that a possibility of starting the engine via the driveline disconnect clutch and ISG may be increased or decreased. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
   adjusting a level of a torque or power demand that is a basis for commanding an engine start and selecting an engine start device from two or more engine starting devices, where the level of the torque or power demand is further based on torque generated via expansion combustion; and
   starting the engine via a flywheel starter or via an integrated starter/generator and a driveline disconnect clutch responsive to an engine starting torque reserve.

2. The method of claim 1, further comprising adjusting the level of the torque or power demand in further response to a ratio of an actual total cumulative number of engine starts in which the flywheel starter cranks the engine to an actual total cumulative distance traveled by the vehicle since a most recent installation of the flywheel starter.

3. The method of claim 1, where the level of the torque or power demand is further based on torque generated via compression combustion.

4. The method of claim 1, where the level of the torque or power demand increases as an actual total cumulative number of engine starts in which the flywheel starter cranks the engine increases.

5. The method of claim 1, further comprising starting the engine via the flywheel starter in response to a driver demand not being less than an electrical system torque or power capacity minus the level of the torque or power demand.

6. The method of claim 1, further comprising starting the engine via the driveline disconnect clutch or the flywheel starter in response to a driver demand being less than an electrical system torque or power capacity minus the level of the torque or power demand.

7. A method for operating a vehicle, comprising:
   adjusting a level of a torque or power demand that is a basis for commanding an engine start and selecting an engine start device from two or more engine starting devices;
   starting the engine via a flywheel starter or via an integrated starter/generator and a driveline disconnect clutch responsive to an engine starting torque reserve; and
   adjusting the level of the torque or power demand in further response to a ratio of an actual total cumulative number of engine starts in which the flywheel starter cranks the engine to an actual total cumulative distance traveled by the vehicle since a most recent installation of the flywheel starter.

8. A method for operating a vehicle, comprising:
   adjusting a level of a torque or power demand that is a basis for commanding an engine start and selecting an engine start device from two or more engine starting devices, where the level of the torque or power demand increases as an actual total cumulative number of engine starts in which the flywheel starter cranks the engine increases; and
   starting the engine via a flywheel starter or via an integrated starter/generator and a driveline disconnect clutch responsive to an engine starting torque reserve.

* * * * *